United States Patent
Shi

(10) Patent No.: US 12,167,335 B2
(45) Date of Patent: Dec. 10, 2024

(54) DISCONTINUOUS RECEPTION METHOD, ELECTRONIC DEVICE AND STORAGE MEDIUM

(71) Applicant: GUANGDONG OPPO MOBILE TELECOMMUNICATIONS CORP., LTD., Dongguan (CN)

(72) Inventor: Cong Shi, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 321 days.

(21) Appl. No.: 17/541,545

(22) Filed: Dec. 3, 2021

(65) Prior Publication Data
US 2022/0095230 A1    Mar. 24, 2022

Related U.S. Application Data

(63) Continuation of application No. PCT/CN2019/125924, filed on Dec. 17, 2019.

(51) Int. Cl.
*H04W 52/02*    (2009.01)
*H04W 72/1268*    (2023.01)
(Continued)

(52) U.S. Cl.
CPC ... *H04W 52/0232* (2013.01); *H04W 72/1268* (2013.01); *H04W 76/28* (2018.02); *H04W 80/02* (2013.01)

(58) Field of Classification Search
CPC .............. H04W 56/005; H04W 56/00; H04W 72/1268; H04W 74/0833; H04W 74/0841;
(Continued)

(56) References Cited

U.S. PATENT DOCUMENTS

2014/0185467 A1    7/2014    Heo et al.
2016/0192433 A1*   6/2016    Deenoo ............... H04W 24/08
                                                    370/329
(Continued)

FOREIGN PATENT DOCUMENTS

CN    108184263 A    6/2018
CN    108616897 A    10/2018
(Continued)

OTHER PUBLICATIONS

"Introduction of secondary DRX group"; 3GPP TSG-RAN2 Meeting #108; R2-1915290 Reno, USA, Nov. 18-22, 2019 (Year: 2019).*
(Continued)

*Primary Examiner* — Nathan S Taylor
(74) *Attorney, Agent, or Firm* — Sheppard, Mullin, Richter & Hampton LLP

(57) ABSTRACT

The present disclosure provides a discontinuous reception method. The method includes: determining, by a terminal device when a Media Access Control (MAC) entity of the terminal device includes two Discontinuous Reception (DRX) groups and the terminal device transmits a Scheduling Request (SR) on a Physical Uplink Control Channel (PUCCH) of a first serving cell, at least one DRX group to enter DRX Active Time. The present disclosure also provides another discontinuous reception method, an electronic device, and a storage medium.

7 Claims, 4 Drawing Sheets

A network device transmits indication information to a terminal device, the indication information being used by the terminal device to determine, when a MAC entity of the terminal device includes two DRX groups and the terminal device transmits an SR on a PUCCH of a first serving cell, at least one DRX group to enter DRX Active Time.    S901

(51) Int. Cl.
*H04W 76/28* (2018.01)
*H04W 80/02* (2009.01)

(58) Field of Classification Search
CPC . H04W 74/0866; H04W 74/08; H04W 72/12; H04W 24/02; H04W 52/0209; H04W 52/0216; H04W 52/0219; H04W 52/0232; H04W 76/28; H04W 80/02; H04W 88/02; H04W 52/02; G01S 13/003; G01S 13/765; G01S 13/767; G01S 13/87; G01S 13/00; G01S 13/76; G01S 5/02; H04L 43/0864
See application file for complete search history.

(56) References Cited

U.S. PATENT DOCUMENTS

| | | | |
|---|---|---|---|
| 2016/0286604 A1* | 9/2016 | Heo | H04W 28/0278 |
| 2017/0000015 A1* | 1/2017 | Raetzman | A01C 5/068 |
| 2017/0150447 A1* | 5/2017 | Kim | H04W 72/23 |
| 2017/0245320 A1* | 8/2017 | Heo | H04W 76/15 |
| 2021/0099954 A1* | 4/2021 | Agiwal | H04W 76/28 |
| 2022/0191794 A1* | 6/2022 | Pan | H04W 52/0232 |
| 2022/0418020 A1* | 12/2022 | Adjakple | H04W 72/1215 |

FOREIGN PATENT DOCUMENTS

| | | |
|---|---|---|
| CN | 109076573 A | 12/2018 |
| CN | 109151909 A | 1/2019 |
| CN | 109842937 A | 6/2019 |
| CN | 110572842 A | 12/2019 |
| WO | 2019033017 A1 | 2/2019 |

OTHER PUBLICATIONS

First Office Action from corresponding Chinese Application No. 202111310716.8, dated Jan. 19, 2023. English translation attached.
Examination Report dated Nov. 23, 2022 received in Europe Patent Application No. EP1995681.5.
NEC."General aspects on cDRX enhancement" 3GPP TSG-RAN WG2 #108 R2-1916187,Nov. 8, 2019,full article.
Extended European Search Report dated Apr. 8, 2022 received in European Patent Application No. EP19956981.5.
Ericsson et al: "cDRX enhancement for CA", 3GPP Draft; R2-1913196 CDRX Enhancement for CA, 3rd Generation Partnership Project (3GPP), Mobile Competence Centre ; 650 , Route Des Lucioles ; F-06921 Sophia-Antipolis Cedex ; France, vol. RAN WG2 , No. Chongqing, China;Oct. 14, 20191-Oct. 18, 2019, Oct. 4, 2019 (Oct. 4, 2019), XP051804887.
International Search Report and Written Opinion date Sep. 25, 2020 in International Application No. PCT/CN2019/125924. English translation attached.
Ericsson, "Introduction of secondary DRX group", 3GPP TSG-RAN2 Meeting #108, R2-1915290, Nov. 22, 2019, Section 5.7, 4 pages.
3GPP, "TSG-RAN WG2 Meeting #108", RAN2 Chairman (Mediatek), "Draft Chair Notes" (2019), 150 pages.

* cited by examiner

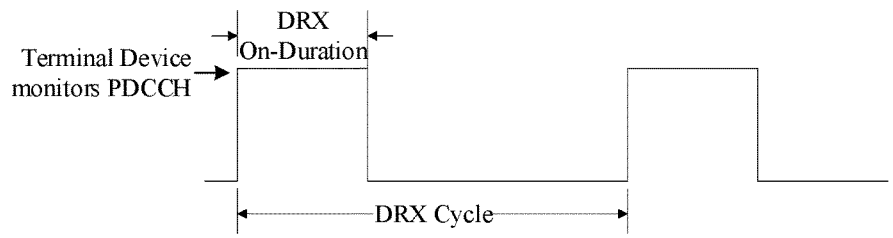
FIG. 1
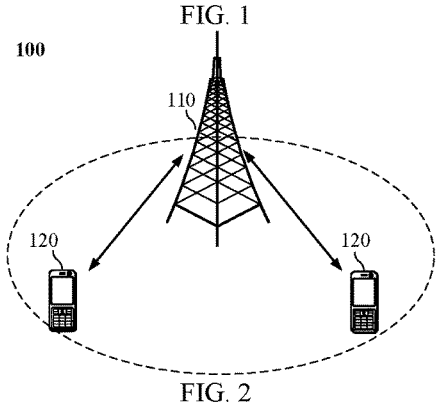
FIG. 2
FIG. 3
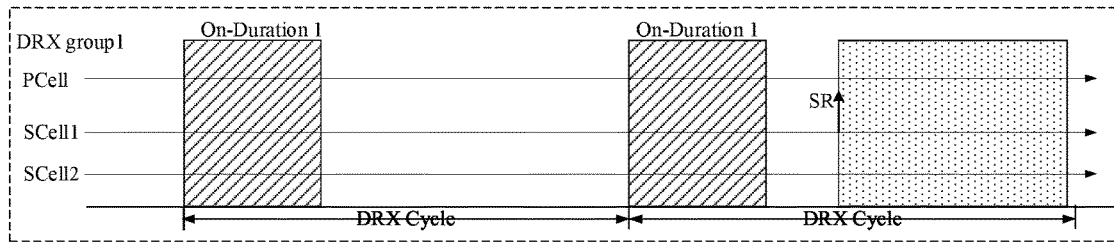
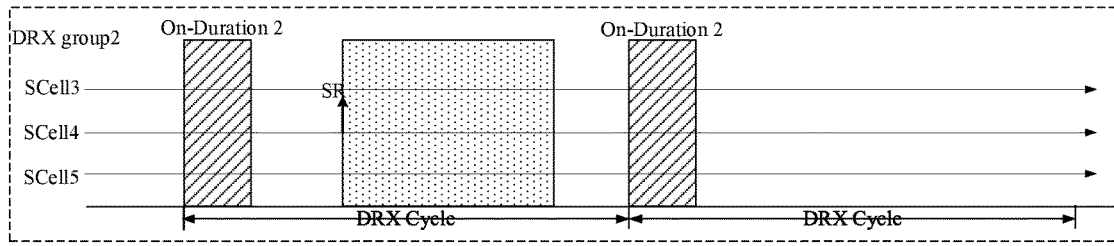
FIG. 4

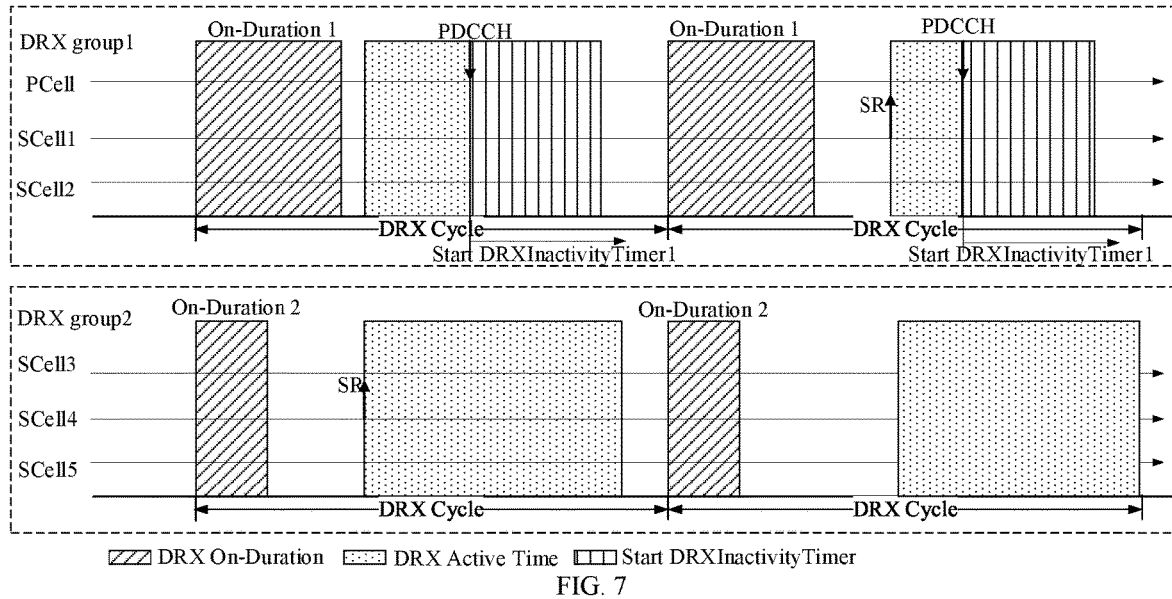
FIG. 7
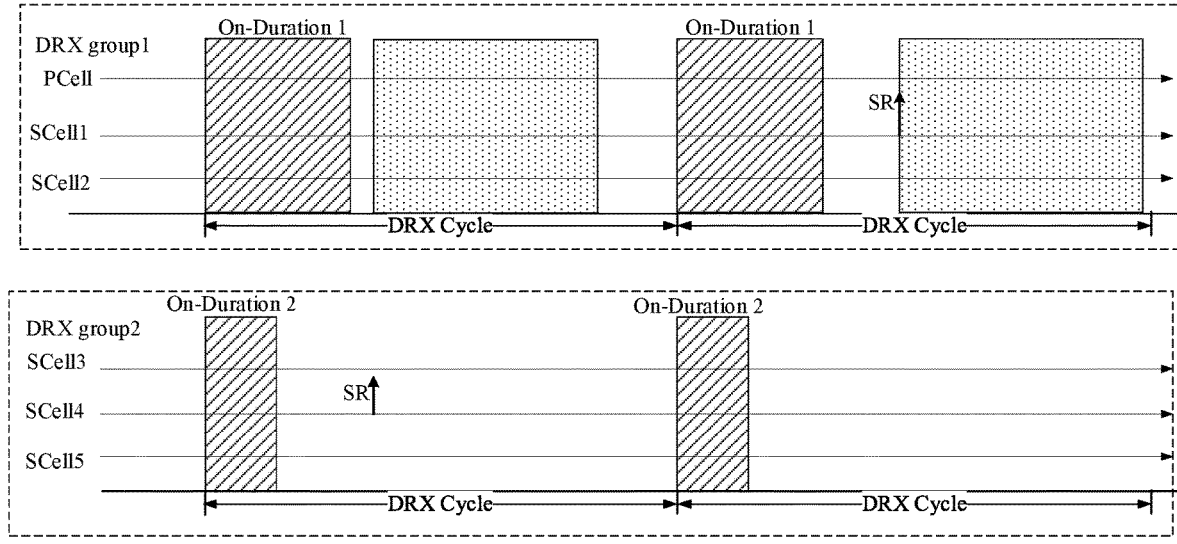
FIG. 8
A network device transmits indication information to a terminal device, the indication information being used by the terminal device to determine, when a MAC entity of the terminal device includes two DRX groups and the terminal device transmits an SR on a PUCCH of a first serving cell, at least one DRX group to enter DRX Active Time.
S901
FIG. 9

DISCONTINUOUS RECEPTION METHOD, ELECTRONIC DEVICE AND STORAGE MEDIUM

CROSS-REFERENCE TO RELATED APPLICATIONS

The present application is a continuation of International Application No. PCT/CN2019/125924 filed on Dec. 17, 2019, which is hereby incorporated by reference in its entirety.

TECHNICAL FIELD

The present disclosure relates to wireless communication technology, and more particularly, to a discontinuous reception method, an electronic device and a storage medium.

BACKGROUND

When two Discontinuous Reception (DRX) groups are configured for a Media Access Control (MAC) entity of a terminal device, it is not clear how the terminal device is to determine a DRX group to enter DRX Active Time.

SUMMARY

The embodiments of the present disclosure provide a discontinuous reception method, an electronic device and a storage medium, capable of allowing a terminal device to determine a DRX group to enter DRX Active Time when two DRX groups are configured for an MAC entity of the terminal device.

In a first aspect, a discontinuous reception method is provided according to an embodiment of the present disclosure. The method includes: determining, by a terminal device when an MAC entity of the terminal device includes two DRX groups and the terminal device transmits a Scheduling Request (SR) on a Physical Uplink Control Channel (PUCCH) of a first serving cell, at least one DRX group to enter DRX Active Time.

In a second aspect, a discontinuous reception method is provided according to an embodiment of the present disclosure. The method includes: transmitting, by a network device, indication information to a terminal device, the indication information being used by the terminal device to determine, when an MAC entity of the terminal device includes two DRX groups and the terminal device transmits an SR on a PUCCH of a first serving cell, at least one DRX group to enter DRX Active Time.

In a third aspect, a terminal device is provided according to an embodiment of the present disclosure. The terminal device includes: a processing unit configured to determine, when an MAC entity of the terminal device includes two DRX groups and the terminal device transmits an SR on a PUCCH of a first serving cell, at least one DRX group to enter DRX Active Time.

In a fourth aspect, a network device is provided according to an embodiment of the present disclosure. The network device includes: a transmitting unit configured to transmit indication information to a terminal device, the indication information being used by the terminal device to determine, when an MAC entity of the terminal device includes two DRX groups and the terminal device transmits an SR on a PUCCH of a first serving cell, at least one DRX group to enter DRX Active Time.

In a fifth aspect, an embodiment of the present disclosure provides a terminal device. The terminal device includes a processor and a memory for storing a computer program executable on the processor. The processor is configured to, when executing the computer program, perform the steps of the above discontinuous reception method performed by the terminal device.

In a sixth aspect, an embodiment of the present disclosure provides a network device. The network device includes a processor and a memory for storing a computer program executable on the processor. The processor is configured to, when executing the computer program, perform the steps of the above discontinuous reception method performed by the network device.

In a seventh aspect, an embodiment of the present disclosure provides a chip. The chip includes a processor configured to invoke and execute a computer program from a memory, to enable a terminal device provided with the chip to perform the above discontinuous reception method.

In an eighth aspect, an embodiment of the present disclosure provides a chip. The chip includes a processor configured to invoke and execute a computer program from a memory, to enable a network device provided with the chip to perform the above discontinuous reception method.

In a ninth aspect, an embodiment of the present disclosure provides a storage medium. The storage medium stores an executable program which, when executed by a processor, implements the above discontinuous reception method performed by the terminal device.

In a tenth aspect, an embodiment of the present disclosure provides a storage medium. The storage medium stores an executable program which, when executed by a processor, implements the above discontinuous reception method performed by the network device.

In an eleventh aspect, an embodiment of the present disclosure provides a computer program product. The computer program product includes computer program instructions that cause a computer to perform the above discontinuous reception method performed by the terminal device.

In a twelfth aspect, an embodiment of the present disclosure provides a computer program product. The computer program product includes computer program instructions that cause a computer to perform the above discontinuous reception method performed by the network device.

In a thirteenth aspect, an embodiment of the present disclosure provides a computer program. The computer program causes a computer to perform the above discontinuous reception method performed by the terminal device.

In a fourteenth aspect, an embodiment of the present disclosure provides a computer program. The computer program causes a computer to perform the above discontinuous reception method performed by the network device.

A discontinuous reception method according to an embodiment of the present disclosure includes: determining, by a terminal device when an MAC entity of the terminal device includes two DRX groups and the terminal device transmits an SR on a PUCCH of a first serving cell, at least one DRX group to enter DRX Active Time. As such, according to the embodiment of the present disclosure, when the MAC entity of the terminal device includes two DRX groups and the terminal device transmits the SR on the PUCCH of the first serving cell, the terminal device can determine one or two DRX groups to enter the DRX Active Time.

BRIEF DESCRIPTION OF DRAWINGS

FIG. 1 is a schematic diagram showing a discontinuous reception cycle of a terminal device of the present disclosure;

FIG. 2 is a schematic diagram showing a structure of a communication system according to an embodiment of the present disclosure;

FIG. 3 is a schematic diagram of an optional processing flow of a discontinuous reception method according to an embodiment of the present disclosure;

FIG. 4 is a first schematic diagram showing a terminal device entering DRX Active Time according to an embodiment of the present disclosure;

FIG. 7 is a fourth schematic diagram showing a terminal device entering DRX Active Time according to an embodiment of the present disclosure;

FIG. 8 is a fifth schematic diagram showing a terminal device entering DRX Active Time according to an embodiment of the present disclosure;

FIG. 9 is a schematic diagram showing another optional processing flow of a discontinuous reception method according to an embodiment of the present disclosure;

DESCRIPTION OF EMBODIMENTS

Figure 5:
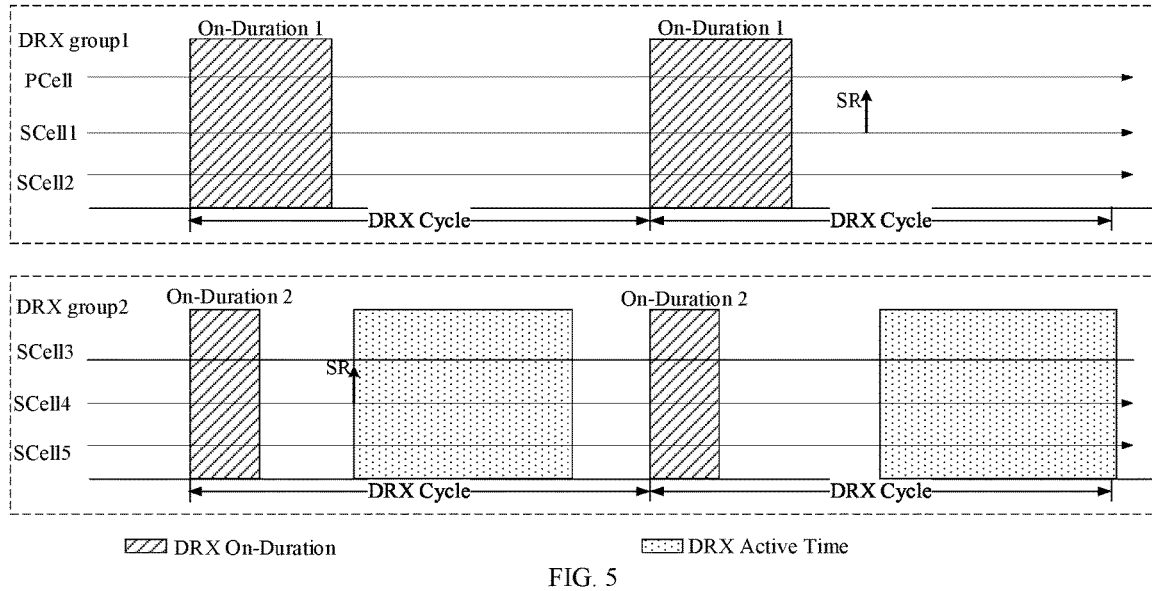
FIG. 5 is a second schematic diagram showing a terminal device entering DRX Active Time according to an embodiment of the present disclosure.

In order to facilitate a more thorough understanding of the features and technical content of the embodiments of the present disclosure, the implementation of the embodiments of the present disclosure will be described in detail below with reference to the figures. The figures are for reference only and are not intended to limit the embodiments of the present disclosure.

Before describing the discontinuous reception method according to the embodiment of the present disclosure, a brief introduction of DRX in the NR system will be given first.

In the NR system, the network device can configure a DRX function for a terminal device. The terminal device can discontinuously monitor a Physical Downlink Control Channel (PDCCH) for the purpose of power saving. Each MAC entity has a DRX configuration, and DRX configuration parameters include:

1) DRX On-Duration Timer (DRX-onDuration Timer): a duration during which the terminal device is awake at the beginning of a DRX cycle;
2) DRX Slot Offset (DRX-SlotOffset): a time delay for the terminal device to start the DRX-onDuration Timer.
3) DRX Inactivity Timer (DRX-InactivityTimer): a duration during which the terminal device continues to monitor the PDCCH when the terminal device receives a PDCCH indicating an initial uplink transmission or an initial downlink transmission;
4) DRX Downlink Retransmission Timer (DRX-RetransmissionTimerDL): a maximum duration during which the terminal device monitors the PDCCH indicating downlink retransmission scheduling, each downlink Hybrid Automatic Repeat reQuest (HARQ) process, except the broadcast HARQ process, corresponding to a DRX-RetransmissionTimerDL;
5) DRX Uplink Retransmission Timer (DRX-RetransmissionTimerUL): a maximum duration during which the terminal device monitors the PDCCH indicating uplink retransmission scheduling, each uplink HARQ process corresponding to a DRX-RetransmissionTimerUL;
6) DRX Long Cycle Start Offset (DRX-LongCycleStartOffset): used to configure the long DRX cycle and start subframe offsets for the Long DRX cycle and the short DRX cycle;
7) DRX Short Cycle (DRX-ShortCycle): an optional configuration;
8) DRX Short Cycle Timer (DRX-ShortCycleTimer): a duration during which the terminal device is in the Short DRX cycle (without receiving any PDCCH), which is an optional configuration;
9) DRX-HARQ-RTT-TimerDL: a minimum waiting time required for the terminal device to expect to receive the PDCCH indicating downlink scheduling, each downlink HARQ process, except the broadcast HARQ process, corresponding to a DRX-HARQ-RTT-TimerDL; and
10) DRX-HARQ-RTT-TimerUL: a minimum waiting time required for the terminal device to expect to receive the PDCCH indicating uplink scheduling, each uplink HARQ process corresponding to a drx-HARQ-RTT-TimerUL.

If a terminal device is configured with DRX, the terminal device needs to monitor the PDCCH in the DRX Active Time. The DRX Active Time includes the following situations:

1) any one of the following five timers is running: DRX-onDurationTimer, DRX-Inactivity Timer, DRX-RetransmissionTimerDL, DRX-RetransmissionTimerUL, and Contention Resolution Timer (ra-ContentionResolutionTimer);
2) an SR is transmitted on the PUCCH and is in a pending state; and
3) in the process of contention-based random access, the terminal device has not received one initial transmission of a PDCCH indication scrambled with a Cell Radio Network Temporary Identifier (C-RNTI) after successfully receiving a random access response.

DRX long DRX is a default configuration, and DRX short DRX is an optional configuration. For a terminal device configured with the short DRX cycle, the conversion between the long DRX cycle and the short DRX cycle is as follows:

When any of the following conditions is met, the terminal device uses the DRX short cycle:

1) DRX-InactivityTimer expires; and
2) the terminal receives a DRX Command MAC CE.

When any of the following conditions is met, the terminal device uses the DRX long cycle:

1) DRX-ShortCycleTimer expires; and
2) the terminal device receives a long DRX command MAC CE.

The terminal device determines the time to start the drx-onDurationTimer based on whether it is currently in the short DRX cycle or the long DRX cycle. The specific rules are as follows:

1) If the Short DRX Cycle is used, and the current subframe satisfies [(SFN×10)+subframe number] modulo (DRX-ShortCycle)=(DRX-StartOffset) modulo (DRX-ShortCycle); or if the Long DRX Cycle is used, and the current subframe satisfies [(SFN×10)+subframe number] modulo (DRX-LongCycle)=DRX-StartOffset; and 2) the drx-onDurationTimer is started at drx-SlotOffset slots after the current subframe.

FIG. 1 shows a schematic diagram of a DRX cycle of a terminal device. The terminal device is configured by a network device with a Wake Up Signal (WakeUpSignal, or WUS) function. The network can transmit a WUS to the terminal device before start of a DRX-onDurationTimer to notify the terminal whether it needs to start the DRX-onDurationTimer to monitor a PDCCH.

In order to provide a higher data transmission rate, the system bandwidth is further increased in the New Radio (NR) system. For frequency bands below 6 GHz, the maximum bandwidth supported by a single carrier is 100 MHz, whereas for frequency bands above 6 GHz, the maximum bandwidth supported by a single carrier is 400 MHz.

The NR system also supports Carrier Aggregation (CA) technology. For a terminal device that supports CA, in addition to configuring a Primary Cell (PCell), the network device may also configure one or more Secondary Cells (SCells) for the terminal device. An SCell has two states: active and inactive. Only when an SCell is in the active state, the terminal device can transmit and receive data on the SCell. The terminal device can monitor PDCCHs and transmit and receive data on the PCell and one or more active SCells at the same time, thereby increasing the data transmission rate.

The terminal device applies for uplink resources from the network device via a Scheduling Request (SR). The network device does not know when the terminal device needs to transmit uplink data, that is, the network device does not know when the terminal device will transmit the SR. Therefore, the network device can allocate periodic PUCCH resources for the terminal device to transmit the SR, and then the network device can detect whether there is an SR reporting on the allocated SR resources.

It can be seen from the above triggering conditions for the SR that the SR in the NR system is based on logical channels. For each uplink logical channel, the network device can choose whether to configure PUCCH resources for transmitting the SR for the uplink logical channel. When an SR is triggered for an uplink logical channel, if the network device configures PUCCH resources for transmitting the SR for the uplink logical channel, the terminal device can transmit the SR on the PUCCH resource for transmitting the SR corresponding to the logical channel; or otherwise, the terminal device can initiate random access.

The network device can configure a plurality of PUCCH resources for transmitting the SR for the terminal device. For an uplink logical channel, if the network device configures the PUCCH resource for transmitting the SR for the uplink logical channel, on each uplink Bandwidth Part (BWP) of each serving cell of the terminal device, the network device can configure at most one PUCCH resource for transmitting the SR for the logical channel.

Each PUCCH resource for transmitting the SR corresponds to the following configuration parameters: a PUCCH resource period, a PUCCH time slot/time symbol offset, and a PUCCH resource index.

In the related art, each MAC entity corresponds to one DRX configuration or two DRX configurations. When one MAC entity configuration includes two DRX configurations, the DRX configurations include DRX group 1 and DRX group 2. For each of DRX group 1 and DRX group 2, the network device may configure a DRX-InactivityTimer and a DRX-onDurationTimer. Other configuration parameters in the DRX configurations are common configuration parameters for DRX group 1 and DRX group 2. When one MAC entity configuration includes two DRX configurations, cross-carrier scheduling between DRX group 1 and DRX group 2 is not supported.

In the mechanism where one MAC entity corresponds to one DRX configuration, if the terminal device transmits an SR on a PUCCH, the terminal device enters the DRX active time. When one MAC entity is configured with two DRX groups, if data arrives at a certain uplink logical channel of the terminal device, which triggers an SR, and the terminal device transmits the SR on a PUCCH of a serving cell. In this case, it is unclear whether the terminal device is to enter the DRX active time on one of the two DRX groups corresponding to the MAC entity, or to enter the DRX active time on both DRX groups, and if the terminal device is to enter the DRX active time on one DRX group, on which DRX group the terminal device is to enter the DRX active time.

An embodiment of the present disclosure provides a discontinuous reception method, which can be applied to various communication systems, including for example: Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Universal Mobile Telecommunication System (UMTS), Worldwide Interoperability for Microwave Access (WiMAX) communication system, Wireless Local Area Network (WLAN), Wireless Fidelity (WiFi), next-generation communication system, or any other communication system, etc.

Generally, traditional communication systems support a limited number of connections and are easy to implement. However, with the development of communication technology, mobile communication systems will support not only traditional communication, but also for example Device to Device (D2D) communication, Machine to Machine (M2M) communication, Machine Type Communication (MTC), and Vehicle to Vehicle (V2V) communication, etc. The embodiments of the present disclosure can also be applied to these communication systems.

The system architecture and service scenarios described in the embodiments of the present disclosure are intended to illustrate the technical solutions of the embodiments of the present disclosure more clearly, and do not constitute any limitation on the technical solutions according to the embodiments of the present disclosure. It can be appreciated by those of ordinary skill in the art that with the evolution of the network architecture and the emergence of new service scenarios, the technical solutions according to the embodiments of the present disclosure will be equally applicable to similar technical problems.

The network device in the embodiments of the present disclosure may be an ordinary base station (such as a NodeB or eNB or gNB), a New Radio (NR) controller, a centralized unit, an NR base station, a remote radio module, a micro base station, a relay, a distributed unit, a Transmission Reception Point (TRP), a Transmission Point (TP), or any other device. The embodiments of the present disclosure is not limited to any specific technology or any specific device form adopted by the network device. For the purpose of description, in all the embodiments of the present disclosure, the above apparatuses that provide wireless communication functions for terminal devices are collectively referred to as network devices.

In the embodiments of the present disclosure, the terminal device may be any terminal. For example, the terminal device may be a user equipment of machine type communication. In other words, the terminal device can also be referred to as User Equipment (UE), Mobile Station (MS), mobile terminal, terminal, etc., and the terminal device can communicate with one or more core networks via a Radio Access Network (RAN). For example, the terminal device can be a mobile phone (or referred to as a "cellular" phone), a computer with a mobile terminal, etc. For example, the terminal device can also be a portable, pocket-sized, handheld, computer-built-in, or vehicle-mounted mobile device that can exchange language and/or data with the radio access network. The embodiments of the present disclosure are not limited to any of these examples.

Optionally, the network device and the terminal device can be deployed on land, including indoor or outdoor, handheld or vehicle-mounted, or on water or on airborne aircraft, balloon, or satellite. The embodiments of the present disclosure are not limited to any application scenarios of the network device and the terminal device.

Optionally, the communication between the network device and the terminal device and between the terminal devices can be carried out on a licensed spectrum, an unlicensed spectrum, or both. The communication between the network device and the terminal device and between the terminal devices can be carried out on the frequency spectrum below 7 gigahertz (GHz), the frequency spectrum above 7 GHz, or both. The embodiments of the present disclosure are not limited to any specific spectral resources used between the network device and the terminal device.

Generally, traditional communication systems support a limited number of connections and are easy to implement. However, with the development of communication technology, mobile communication systems will support not only traditional communication, but also for example Device to Device (D2D) communication, Machine to Machine (M2M) communication, Machine Type Communication (MTC), and Vehicle to Vehicle (V2V) communication, etc. The embodiments of the present disclosure can also be applied to these communication systems.

Exemplarily, the communication system 100 in which the embodiments of the present disclosure can be applied is shown in FIG. 2. The communication system 100 may include a network device 110, which may be a device that communicates with terminal devices 120 (or referred to as communication terminal or terminal). The network device 110 may provide communication coverage for a specific geographic area, and may communicate with terminal devices located in the coverage area. Optionally, the network device 110 may be a base station such as Base Transceiver Station (BTS) in a GSM system or a CDMA system, a base station such as a NodeB (NB) in a WCDMA system, an evolved base station such as an evolutional Node B (eNB or eNodeB) in an LTE system, or a wireless controller in a Cloud Radio Access Network (CRAN). Alternatively, the network device can be a mobile switching center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 also includes at least one terminal device 120 located within the coverage area of the network device 110. As used herein, the "terminal device" may include, but not limited to, an apparatus connected via a wired line, e.g., via a Public Switched Telephone Network (PSTN), a Digital Subscriber Line (DSL), a digital cable, or a direct cable connection, and/or via another data connection/network, and/or via a wireless interface, e.g., for a cellular network, a Wireless Local Area Network (WLAN), a digital TV network such as a DVB-H network, a satellite network, an AM-FM broadcast transmitter, and/or another terminal device, and configured to receive/transmit communication signals, and/or an Internet of Things (IoT) device. A terminal device configured to communicate via a wireless interface may be referred to as a "wireless communication terminal", a "wireless terminal", or a "mobile terminal". Examples of the mobile terminal may include, but not limited to, a satellite or cellular phone, a Personal Communications System (PCS) terminal combining cellular radio phone with data processing, fax, and data communication capabilities, a PDA including a radio phone, a pager, Internet/intranet access, a Web browser, a memo pad, a calendar, and/or a Global Positioning System (GPS) receiver, or a conventional laptop and/or palmtop receiver or another electronic device including a radio telephone transceiver. The terminal device may be an access terminal, a User Equipment (UE), a user unit, a user station, a mobile station, a mobile device, a remote station, a remote terminal, a mobile device, a user terminal, a terminal, a wireless communication device, a user agent, or a user. Device. Alternatively, the access terminal can be a cellular phone, a cordless phone, a Session Initiation Protocol (SIP) phone, a Wireless Local Loop (WLL) station, a Personal Digital Assistant (PDA), a handheld device or a computing device having a wireless communication function, another processing device connected to a wireless modem, a vehicle-mounted device, a wearable device, a terminal device in a 5G network, or a terminal devices in a future evolved PLMN, etc.

Optionally, direct communication such as Device to Device (D2D) communication may be performed between the terminal devices 120.

Optionally, the 5G system or 5G network may also be referred to as a New Radio (NR) system or NR network.

FIG. 3 shows an optional processing flow of a discontinuous reception method according to an embodiment of the present disclosure, including the following step.

At step S201, a terminal device determines, when an MAC entity of the terminal device includes two DRX groups and the terminal device transmits an SR on a PUCCH of a first serving cell, at least one DRX group to enter DRX Active Time.

In some embodiments, the terminal device may determine one of the two DRX groups to enter the DRX Active Time. Alternatively, the terminal device may determine both DRX groups to enter the DRX Active Time. Here, the two DRX groups correspond to different cells. For example, one of the two DRX groups corresponds to PCell and SCell 1, and the other of the two DRX groups corresponds to SCell 2 and SCell 3.

In the following, the optional processing flow for the terminal device to determine the at least one DRX group to enter the DRX Active Time will be described.

In some embodiments, the terminal device may determine the at least one DRX group to enter the DRX Active Time based on the first serving cell.

In a specific implementation, the terminal device may determine a first DRX group corresponding to the first serving cell as the at least one DRX group to enter the DRX Active Time. A correspondence between the first serving cell and the first DRX group may be carried in Radio Resource Control (RRC) configuration information transmitted by a network device to the terminal device. Here, the first serving cell is a cell serving the terminal device in a CA scenario.

For example, if the terminal device transmits the SR on the PUCCH of the first serving cell, and if the terminal device learns that the first serving cell corresponds to DRX group 1 from the RRC configuration information transmitted by the network device, the terminal device may enter the DRX Active Time on DRX group 1, or if the terminal device learns that the first serving cell corresponds to DRX group 2 from the RRC configuration information transmitted by the network device, the terminal device may enter the DRX Active Time on DRX group 2. Optionally, the terminal device can monitor a PDCCH on an active serving cell corresponding to DRX group 1 or DRX group 2 that enters the DRX Active Time.

In the embodiment of the present disclosure, the terminal device can determine the at least one DRX group to enter the DRX Active Time based on the first serving cell, and can determine which of the two DRX groups to enter the DRX Active Time. When one of the DRX groups enters the DRX Active Time, the power consumption of the terminal device can be saved.

In some other embodiments, the terminal device may determine the at least one DRX group to enter the DRX Active Time based on indication information transmitted by the network device.

The indication information may be carried in the RRC configuration information transmitted by the network device to the terminal device. The indication information may include a correspondence between an uplink logical channel that triggers the SR and the at least one DRX group to enter the DRX Active Time.

In a specific implementation, the terminal device may determine, based on the indication information, a DRX group corresponding to the uplink logical channel that triggers the SR as the at least one DRX group to enter the DRX Active Time.

For example, when the indication information indicates that the uplink logical channel that triggers the SR corresponds to a first DRX group, the terminal device can determine the first DRX group as the at least one DRX group to enter the DRX Active Time. Alternatively, when the indication information indicates that the uplink logical channel that triggers the SR corresponds to a second DRX group, the terminal device can determine the second DRX group as the at least one DRX group to enter the DRX Active Time. Alternatively, when the indication information indicates that the uplink logical channel that triggers the SR corresponds to a first DRX group and a second DRX group, the terminal device can determine the first DRX group and the second DRX group as the at least one DRX group to enter the DRX Active Time.

In the embodiment of the present disclosure, the terminal device can determine one or two DRX groups to enter the DRX Active Time based on the indication information transmitted by the network device. When determining one DRX group to enter the DRX Active Time, it can determine which DRX group to enter the DRX Active Time based on the indication information transmitted by the network device, thereby improving the performance of the terminal device.

In other embodiments, the terminal device may determine a first DRX group and a second DRX group corresponding to serving cells of the terminal device as the at least one DRX group to enter the DRX Active Time.

In a specific implementation, if the terminal device receives scheduling information on the PDCCH of the first serving cell, the terminal device can start a DRX-InactivityTimer on the first DRX group corresponding to the first serving cell. Accordingly, the terminal device may monitor a PDCCH on the serving cell corresponding to the first DRX group. For the second DRX group, when a first timer for the second DRX group is not running, the terminal device may enter the DRX Inactive Time on the second DRX group. The first timer may include: DRX-onDurationTimer, DRX-InactivityTimer, DRX-Retransmission TimerDL, DRX-Retransmission TimerUL, and ra-ContentionResolutionTimer. That is, the terminal device may enter the DRX Inactive Time on the second DRX group when none of DRX-onDurationTimer, DRX-InactivityTimer, DRX-Retransmission TimerDL, DRX-Retransmission TimerUL, and ra-ContentionResolutionTimer is running. When a second timer is running, the terminal device may maintain in the DRX Active Time on the second DRX group. Here, the second timer may include at least one of: DRX-onDurationTimer, DRX-InactivityTimer, DRX-Retransmission TimerDL, DRX-Retransmission TimerUL, and ra-ContentionResolutionTimer. That is, the terminal device may maintain in the DRX Active Time on the second DRX group when at least one of DRX-onDurationTimer, DRX-Inactivity Timer, DRX-Retransmission TimerDL, DRX-Retransmission TimerUL, and ra-ContentionResolutionTimer timers is running.

Similarly, if the terminal device receives scheduling information on the PDCCH of the second serving cell, the terminal device can start a DRX-InactivityTimer on the second DRX group corresponding to the second serving cell. Accordingly, the terminal device may monitor a PDCCH on the serving cell corresponding to the second DRX group. For the first DRX group, when none of DRX-onDurationTimer, DRX-InactivityTimer, DRX-Retransmission TimerDL, DRX-Retransmission TimerUL and ra-ContentionResolutionTimer for the first DRX group is running, the terminal device may enter the DRX Inactive Time on the first DRX group. When at least one of the above five timers is running, the terminal device may maintain in the DRX Active Time on the first DRX group. In this way, the flexibility of scheduling by the network device can be improved.

In some other embodiments, the terminal device may determine a first DRX group and a second DRX group corresponding to serving cells of the terminal device as the at least one DRX group to enter the DRX Active Time. Here, the first DRX group and the second DRX group may correspond to different cells. For example, one of the two DRX groups may correspond to PCell and SCell1, and the other of the two DRX groups may correspond to SCell2 and SCell3.

In a specific implementation, if the terminal device receives scheduling information on a PDCCH of the first serving cell, the terminal device can start a DRX-InactivityTimer on the first DRX group corresponding to the first serving cell. For the second DRX group, the terminal device may maintain in the DRX Active Time on the second DRX group. In this way, the flexibility of scheduling by the network device can be improved.

In some other embodiments, the terminal device may determine a DRX group corresponding to a PCell of the terminal device as the at least one DRX group to enter the DRX Active Time.

In a specific implementation, no matter the terminal device transmits the SR on the PUCCH of which serving cell, and no matter the uplink logical channel that triggers the SR corresponds to which DRX group, as long as the MAC entity of the terminal device includes two DRX groups, if the terminal device transmit the SR on the PUCCH of the first serving cell, the terminal device may determine the DRX group corresponding to the PCell of the terminal device as the at least one DRX group to enter the DRX Active Time.

In the embodiment of the present disclosure, the terminal device may only enter the DRX Active Time on the DRX group corresponding to the PCell, which can save the power consumption of the terminal device.

The processing flow for the terminal device to determine the DRX group to enter the DRX Active Time will be described in detail below for different cases.

In the case where the terminal device determines the at least one DRX group to enter the DRX Active Time based on the first serving cell, the detailed processing flow for the terminal device to determine the at least one DRX group to enter the DRX Active Time may include the following steps.

At step S301, the terminal device receives RRC configuration information transmitted by the network device.

In some embodiments, the RRC configuration information may include:
1) DRX configuration: The network device configures two DRX groups for the terminal device, i.e., DRX group1 and DRX group2. Here, DRX group1 is used for Frame Relay 1 (FR1), and DRX group 2 is used for FR2. The network device configures DRX-onDurationTimer1 and DRX-InactivityTimer1 for DRX group1, and configures DRX-onDurationTimer2 and DRX-InactivityTimer2 for DRX group2. Other DRX configuration parameters, such as DRX cycle, etc., are common configurations for DRX group1 and DRX group2.
2) Serving cell configuration: The PCell of the terminal device is cell0, and five SCells are configured for the terminal device. Here, PCell, SCell 1, and SCell 2 correspond to FR1, and SCell 3, SCell 4, and SCell 5 correspond to FR2.
3) Uplink logical channel and SR configuration: One PUCCH resource for transmitting the SR is configured on each UL BWP of each serving cell for each uplink logical channel of the terminal device.

At step S302, based on the configuration from the network device, for the DRX group 1, the terminal device periodically starts DRX-onDurationTimer1 according to the DRX cycle, and for the DRX group 2, the terminal device periodically starts DRX-onDurationTimer2 according to the DRX cycle.

In step S303, uplink data arrives at the terminal device, but the terminal device has no resource for uplink transmission, and the terminal device triggers an SR. The terminal device transmits the SR on the PUCCH of SCell 4. As shown in FIG. 4, the terminal device enters the DRX Active Time on DRX group 2 corresponding to SCell 4. During the DRX Active Time of DRX group 2, the terminal device monitors the PDCCH on SCell 3, SCell 4, and SCell 5.

At step S304, subsequently, uplink data arrives at the terminal device, but the terminal device has no resource for uplink transmission, and the terminal device triggers an SR. The terminal device sends an SR on the PUCCH of SCell 1. As shown in FIG. 4, the terminal device enters the DRX Active Time on DRX group 1 corresponding to SCell 1. When DRX group 1 enters the DRX Active Time, the terminal device monitors the PDCCH on the PCell, SCell 1, and SCell 2.

In the case where the terminal device determines the at least one DRX group to enter the DRX Active Time based on the indication information transmitted by the network device, the detailed processing flow for the terminal device to determine the at least one DRX group to enter the DRX Active Time may include the following steps.

At step S401, the terminal device receives RRC configuration information transmitted by the network device.

In some embodiments, the RRC configuration information may include:
1) DRX configuration: Two DRX groups are configured for one MAC entity of the terminal device, i.e., DRX group 1 and DRX group 2. The network device configures DRX-onDurationTimer1 and DRX-InactivityTimer1 for DRX group 1, and configures DRX-onDurationTimer2 and DRX-InactivityTimer2 for DRX group 2. Other DRX configuration parameters, such as DRX cycle, etc., are common configurations for DRX group 1 and DRX group 2.
2) SCell configuration parameter, including at least one SCell.
3) Correspondence between PCell and SCells and DRX groups: Each of the PCell and the SCells corresponds to one of a plurality of DRX groups.
4) For each uplink logical channel of the terminal device, the network device can choose whether to configure a PUCCH resource for transmitting the SR for the uplink logical channel. If an uplink logical channel is chosen to be configured with a PUCCH resource for transmitting the SR, then 0 or 1 PUCCH resource for transmitting the SR may be configured on each UL BWP of each serving cell of the terminal device for the uplink logical channel.
5) For each uplink logical channel configured with the PUCCH resource for transmitting the SR, the network device also configures that, for the uplink logical channel, the SR triggered by the uplink logical channel will trigger the UE to enter the DRX Active Time on which DRX group(s). There are three specific cases.
Case 1: The SR triggered by the uplink logical channel will trigger the terminal device to enter the DRX Active Time on DRX group1;
Case 2: The SR triggered by the uplink logical channel will trigger the terminal device to enter the DRX Active Time on DRX group2;
Case 3: The SR triggered by the uplink logical channel will trigger the terminal device to enter the DRX Active Time on both DRX group 1 and DRX group 2.

When data arrives at a certain uplink logical channel of the terminal device, which triggers an SR, and the terminal device transmits the SR on a PUCCH resource corresponding to the uplink logical channel, the terminal device can make a determination based on indication from the network as follows:
1) If the network device configures that the SR triggered by the uplink logical channel will trigger the terminal device to enter the DRX Active Time on DRX group1, the terminal device may enter the DRX Active Time on DRX group1, and monitor the PDCCH on the (active) serving cell corresponding to DRX group1.
2) If the network device configures that the SR triggered by the uplink logical channel will trigger the terminal device to enter the DRX Active Time on DRX group2, the terminal device may enter the DRX Active Time on DRX group2, and monitor the PDCCH on the (active) serving cell corresponding to the DRX group2.

3) If the network device configures that the SR triggered by the uplink logical channel will trigger the terminal device to enter the DRX Active Time on both DRX group1 and DRX group2, the terminal device may enter the DRX Active Time on both DRX group1 and DRX group2, and monitor the PDCCH on all (active) serving cells.

The following RRC configuration information will be used as an example for explanation below.

The serving cell configuration in the RRC configuration information may be as follows: the PCell of the terminal device is cell0, and five SCells are configured for the terminal device, among which PCell, SCell 1, and SCell 2 correspond to FR1, and SCell 3, SCell 4, and SCell 5 correspond to FR2. The uplink Logical Channel (LC) and SR configuration in the RRC configuration information may be as follows: the terminal device is configured with one uplink LC, and one PUCCH resource for transmitting the SR is configured on each UL BWP of each serving cell for the uplink LC. Moreover, the network device indicates that the SR triggered by the uplink LC will trigger the terminal device to enter the DRX Active Time on DRX group 2.

At step S402, based on the configuration from the network device, for the DRX group 1, the terminal device periodically starts DRX-onDurationTimer1 according to the DRX cycle, and for the DRX group 2, the terminal device periodically starts DRX-onDurationTimer2 according to the DRX cycle.

At step S403, uplink data arrives at the LC of the terminal device, but the terminal device has no resource for uplink transmission, and the UE triggers an SR. The terminal device transmits the SR on the PUCCH of SCell 4. As shown in FIG. 5, the terminal device enters the DRX Active Time on DRX group 2 based on the indication from the network device. While the terminal device is in the DRX Active Time on DRX group 2, the terminal device monitors the PDCCH on SCell 3, SCell 4, and SCell 5.

At step S404, subsequently, uplink data arrives at the terminal device, but the terminal device has no resource for uplink transmission, and the UE triggers an SR. The terminal device transmits the SR on the PUCCH of SCell 1. As shown in FIG. 5, the terminal device enters the DRX Active Time on DRX group 2 based on the indication from the network device. While the terminal device is in the DRX Active Time on DRX group 2, the terminal device monitors the PDCCH on SCell 3, SCell 4, and SCell 5.

In the case where the terminal device determines the first DRX group and the second DRX group corresponding to the serving cells of the terminal device as the at least one DRX group to enter the DRX Active Time, the detailed processing flow for the terminal device to determine the at least one DRX group to enter the DRX Active Time may include the following steps.

At step S501, the terminal device receives RRC configuration information transmitted by the network device.

In some embodiments, the RRC configuration information may include:

1) DRX configuration: Two DRX groups are configured for one MAC entity of the terminal device, i.e., DRX group1 and DRX group2. The network device configures DRX-onDurationTimer1 and DRX-InactivityTimer1 for DRX group1, and configures DRX-onDurationTimer2 and DRX-InactivityTimer2 for DRX group2. Other DRX configuration parameters, such as DRX cycle, etc., are common configurations for DRX group1 and DRX group2.

2) Serving cell configuration in the RRC configuration information: the PCell of the terminal device is cell0, and five SCells are configured for the terminal device, among which PCell, SCell 1, and SCell 2 correspond to FR1, and SCell 3, SCell 4, and SCell 5 correspond to FR2.

3) LC and SR configuration: one PUCCH resource for transmitting the SR is configured on each UL BWP of each serving cell for each uplink LC of the terminal device.

At step S502, based on the configuration from the network device, for the DRX group1, the terminal device periodically starts DRX-onDurationTimer1 according to the DRX cycle, and for the DRX group2, the terminal device periodically starts DRX-onDurationTimer2 according to the DRX cycle.

Figure 6:
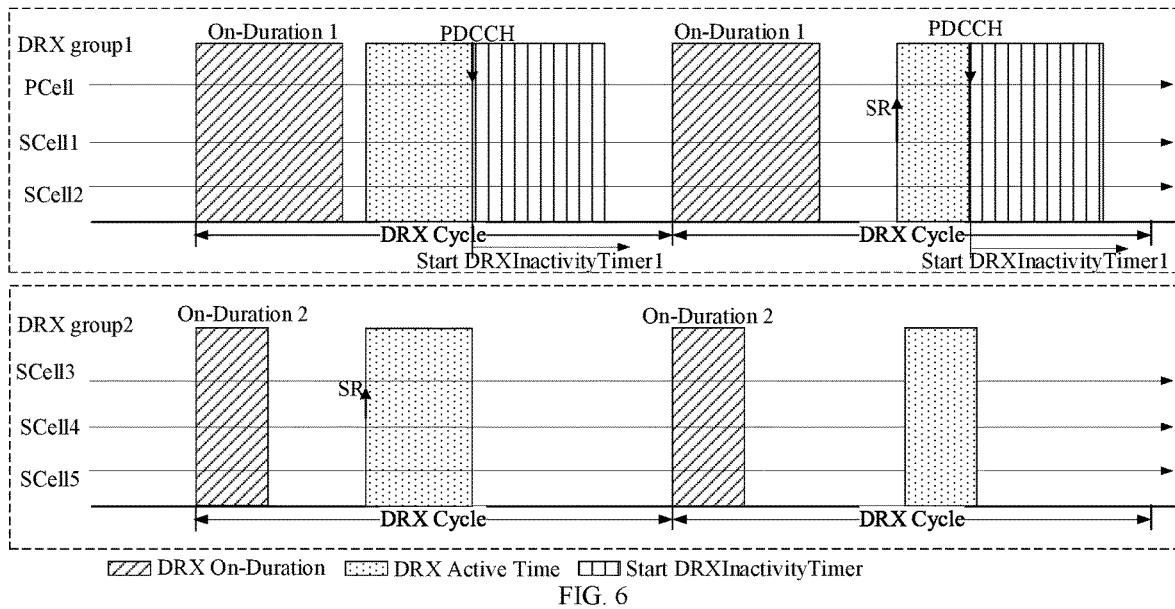
FIG. 6 is a third schematic diagram showing a terminal device entering DRX Active Time according to an embodiment of the present disclosure.

At step S503, uplink data arrives at the terminal device, but the terminal device has no resource for uplink transmission, and the terminal device triggers an SR. The terminal device transmits the SR on the PUCCH of SCell4. As shown in FIG. 6, the terminal device enters the DRX Active Time on both DRX group1 and DRX group2. The terminal device monitors the PDCCH on all serving cells.

At step S504, the terminal device receives a PDCCH indicating scheduling on the PCell, and the terminal device starts DRX-InactivityTimer1 for DRX group1. Accordingly, during the DRX Active Time for DRX group1, the terminal device monitors the PDCCH on the PCell, SCell1, and SCell2. At the same time, for DRX group2, since none of its corresponding DRX-onDurationTimer, DRX-InactivityTimer, DRX-RetransmissionTimerDL, DRX-RetransmissionTimerUL, and ra-ContentionResolutionTimer is running, as shown in FIG. 6, the terminal device enters the DRX Inactive Time on DRX group2.

At step S505, uplink data arrives at the terminal device, but the terminal device has no resource for uplink transmission, and the terminal device triggers an SR. The terminal device transmits the SR on the PUCCH of SCell1. As shown in FIG. 6, the terminal device enters the DRX Active Time on DRX group1 and DRX group2. The terminal device monitors the PDCCH on all serving cells.

At step S506, the terminal device receives a PDCCH indicating scheduling on the PCell, and the terminal device starts DRX-InactivityTimer1 for the DRX group 1. Accordingly, during the DRX Active Time for DRX group1, the terminal device monitors the PDCCH on the PCell, SCell1, and SCell2. At the same time, for DRX group2, since none of its corresponding DRX-onDurationTimer, DRX-InactivityTimer, DRX-RetransmissionTimerDL, DRX-RetransmissionTimerUL, and ra-ContentionResolutionTimer is running, as shown in FIG. 6, the terminal device enters the DRX Inactive Time on DRX group2.

In the case where the terminal device determines the first DRX group and the second DRX group corresponding to the serving cells of the terminal device as the at least one DRX group to enter the DRX Active Time, the detailed processing flow for the terminal device to determine the at least one DRX group to enter the DRX Active Time may include the following steps.

At step S601, the terminal device receives RRC configuration information transmitted by the network device.

In some embodiments, the RRC configuration information may include:

1) DRX configuration: Two DRX groups are configured for one MAC entity of the terminal device, i.e., DRX group1 and DRX group2. The network device configures DRX-onDurationTimer1 and DRX-InactivityTimer1 for DRX group1, and configures DRX-onDurationTimer2 and DRX-InactivityTimer2 for DRX group2. Other DRX configuration parameters, such as DRX cycle, etc., are common configurations for DRX group1 and DRX group2.
2) Serving cell configuration in the RRC configuration information: the PCell of the terminal device is cell0, and five SCells are configured for the terminal device, among which PCell, SCell 1, and SCell 2 correspond to FR1, and SCell 3, SCell 4, and SCell 5 correspond to FR2.
3) LC and SR configuration: one PUCCH resource for transmitting the SR is configured on each UL BWP of each serving cell for each uplink LC of the terminal device.

At step S602, based on the configuration from the network device, for the DRX group1, the terminal device periodically starts DRX-onDurationTimer1 according to the DRX cycle, and for the DRX group2, the terminal device periodically starts DRX-onDurationTimer2 according to the DRX cycle.

At step S603, uplink data arrives at the terminal device, but the terminal device has no resource for uplink transmission, and the terminal device triggers an SR. The terminal device transmits the SR on the PUCCH of SCell4. As shown in FIG. 7, the terminal device enters the DRX Active Time on both DRX group1 and DRX group2. The terminal device monitors the PDCCH on all serving cells.

At step S604, the terminal device receives a PDCCH indicating scheduling on the PCell, and the terminal device starts DRX-InactivityTimer1 for DRX group1. At the same time, as shown in FIG. 7, the terminal device maintains in the DRX Active Time on DRX group2.

At step S605, uplink data arrives at the terminal device, but the terminal device has no resource for uplink transmission, and the terminal device triggers an SR. The terminal device transmits the SR on the PUCCH of SCell1. As shown in FIG. 7, the terminal device enters the DRX Active Time on DRX group1 and DRX group2. The terminal device monitors the PDCCH on all serving cells.

At step S606, the terminal device receives a PDCCH indicating scheduling on the PCell, and the terminal device starts DRX-InactivityTimer1 for DRX group1. At the same time, as shown in FIG. 7, the terminal device maintains in the DRX Active Time on DRX group2.

In the case where the terminal device determines the DRX group corresponding to the PCell of the terminal device as the at least one DRX group to enter the DRX Active Time, the detailed processing flow for the terminal device to determine the at least one DRX group to enter the DRX Active Time may include the following steps.

At step S801, the terminal device receives RRC configuration information transmitted by the network device.

In some embodiments, the RRC configuration information may include:
1) DRX configuration: two DRX groups are configured for one MAC entity of the terminal device, i.e., DRX group1 and DRX group2. The network device configures DRX-onDurationTimer1 and DRX-InactivityTimer1 for DRX group1, and configures DRX-onDurationTimer2 and DRX-InactivityTimer2 for DRX group2. Other DRX configuration parameters, such as DRX cycle, etc., are common configurations for DRX group1 and DRX group2.
2) Serving cell configuration in the RRC configuration information: the PCell of the terminal device is cell0, and five SCells are configured for the terminal device, among which PCell, SCell 1, and SCell 2 correspond to FR1, and SCell 3, SCell 4, and SCell 5 correspond to FR2.
3) LC and SR configuration: one PUCCH resource for transmitting the SR is configured on each UL BWP of each serving cell for each uplink LC of the terminal device.

At step S802, based on the configuration from the network device, for the DRX group1, the terminal device periodically starts DRX-onDurationTimer1 according to the DRX cycle, and for the DRX group2, the terminal device periodically starts DRX-onDurationTimer2 according to the DRX cycle.

At step S803, uplink data arrives at the terminal device, but the terminal device has no resource for uplink transmission, and the terminal device triggers an SR. The terminal device transmits the SR on the PUCCH of SCell4. As shown in FIG. 8, the terminal device enters the DRX Active Time on DRX group1. While the terminal device is in the DRX Active Time on DRX group1, the terminal device monitors the PDCCH on the PCell, SCell 1, and SCell 2.

At step S804, uplink data arrives at the terminal device, but the terminal device has no resource for uplink transmission, and the terminal device triggers an SR. The terminal device transmits an SR on the PUCCH of SCell1. As shown in FIG. 8, the terminal device enters the DRX Active Time on DRX group1. While the terminal device is in the DRX Active Time on DRX group1, the terminal device monitors the PDCCH on the PCell, SCell 1, and SCell 2.

FIG. 9 shows another optional processing flow of a discontinuous reception method according to an embodiment of the present disclosure, including the following step.

At step S901, a network device transmits indication information to a terminal device. The indication information is used by the terminal device to determine, when an MAC entity of the terminal device includes two DRX groups and the terminal device transmits an SR on a PUCCH of a first serving cell, at least one DRX group to enter DRX Active Time.

In some embodiments, the indication information may be carried in RRC configuration information. The indication information may include a correspondence between an uplink logical channel that triggers the SR and the at least one DRX group to enter the DRX Active Time.

In some embodiments, when the indication information indicates that the uplink logical channel that triggers the SR corresponds to a first DRX group, the indication information may indicate the first DRX group as the at least one DRX group to enter the DRX Active Time.

In other embodiments, when the indication information indicates that the uplink logical channel that triggers the SR corresponds to a second DRX group, the indication information may indicate the second DRX group as the at least one DRX group to enter the DRX Active Time.

In other embodiments, when the indication information indicates that the uplink logical channel that triggers the SR corresponds to a first DRX group and a second DRX group, the indication information may indicate the first DRX group and the second DRX group as the at least one DRX group to enter the DRX Active Time.

It can be appreciated that, in the various method embodiments of the present disclosure, the values of the sequence numbers of the above processes does not mean the order in which they are performed. The order in which the respective processes are to be performed should be determined by their functions and internal logics, and should not constitute any limitation on the implementation of the embodiments of the present disclosure.

Figure 10:
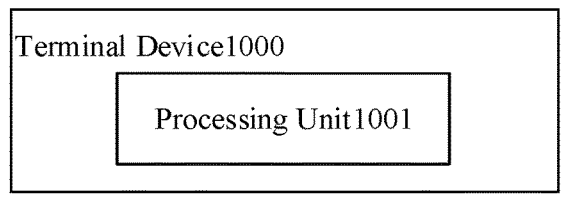
FIG. 10 is a schematic diagram showing a structure of a terminal device according to an embodiment of the present disclosure.

In order to implement the discontinuous reception method described in the embodiment of the present disclosure, an embodiment of the present disclosure provides a terminal device. FIG. 10 shows a structure of a terminal device 1000, including a processing unit 1001 configured to determine, when an MAC entity of the terminal device includes two DRX groups and the terminal device transmits an SR on a PUCCH of a first serving cell, at least one DRX group to enter DRX Active Time.

In some embodiments, the processing unit 1001 may be configured to determine the at least one DRX group to enter the DRX Active Time based on the first serving cell.

In some embodiments, the processing unit 1001 may be configured to determine a first DRX group corresponding to the first serving cell as the at least one DRX group to enter the DRX Active Time.

In some embodiments, the processing unit 1001 may be configured to monitor a PDCCH in an active serving cell corresponding to the first DRX group.

In some embodiments, the first DRX group corresponding to the first serving cell may be carried in RRC configuration information.

In some embodiments, the processing unit 1001 may be configured to determine the at least one DRX group to enter the DRX Active Time based on indication information transmitted by a network device.

In some embodiments, the indication information may be carried in RRC configuration information.

In some embodiments, the indication information may indicate a correspondence between an uplink logical channel that triggers the SR and the at least one DRX group to enter the DRX Active Time.

In some embodiments, the processing unit 1001 may be configured to determine, based on the indication information, to enter the DRX Active Time on the at least one DRX group corresponding to the uplink logical channel that triggers the SR.

In some embodiments, the processing unit 1001 may be configured to determine, when the indication information indicates that the uplink logical channel that triggers the SR corresponds to a first DRX group, the first DRX group as the at least one DRX group to enter the DRX Active Time.

In some embodiments, the processing unit 1001 may be configured to determine, when the indication information indicates that the uplink logical channel that triggers the SR corresponds to a first DRX group and a second DRX group, the first DRX group and the second DRX group as the at least one DRX group to enter the DRX Active Time. The first DRX group and the second DRX group may correspond to different cells.

In some embodiments, the processing unit 1001 may be configured to determine a first DRX group and a second DRX group corresponding to serving cells of the terminal device as the at least one DRX group to enter the DRX Active Time. The first DRX group and the second DRX group may correspond to different cells.

In some embodiments, the processing unit 1001 may be further configured to start, in response to receiving scheduling information on a PDCCH of the first serving cell, a DRX-InactivityTimer on the first DRX group corresponding to the first serving cell.

In some embodiments, the processing unit 1001 may be further configured to monitor a PDCCH on the serving cell corresponding to the first DRX group.

In some embodiments, the processing unit 1001 may be further configured to enter, when a first timer for the second DRX group is not running, DRX Inactive Time on the second DRX group. The first timer may include: DRX-onDurationTimer, DRX-InactivityTimer, DRX-Retransmission TimerDL, DRX-Retransmission TimerUL, and ra-ContentionResolutionTimer.

In some embodiments, the processing unit 1001 may be further configured to maintain, when a second timer for the second DRX group is running, in the DRX Active Time on the second DRX group. The second timer may include at least one of: DRX-onDurationTimer, DRX-InactivityTimer, DRX-Retransmission TimerDL, DRX-Retransmission TimerUL, and ra-ContentionResolutionTimer.

In some embodiments, the processing unit 1001 may be further configured to maintain in the DRX Active Time on the second DRX group.

In some embodiments, the processing unit 1001 may be configured to determine a DRX group corresponding to a PCell of the terminal device as the at least one DRX group to enter the DRX Active Time.

In some embodiments, the processing unit 1001 may be configured to monitor a PDCCH on a serving cell corresponding to the DRX group corresponding to the PCell.

Figure 11:
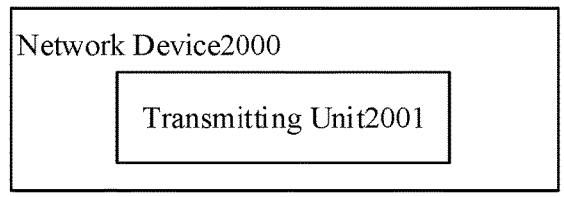
FIG. 11 is a schematic diagram showing a structure of a network device according to an embodiment of the present disclosure.

To implement the discontinuous reception method described in the embodiment of the present disclosure, an embodiment of the present disclosure provides a network device. FIG. 11 shows a structure of the network device 2000, including a transmitting unit 2001 configured to transmit indication information to a terminal device. The indication information is used by the terminal device to determine, when an MAC entity of the terminal device includes two DRX groups and the terminal device transmits an SR on a PUCCH of a first serving cell, at least one DRX group to enter DRX Active Time.

In some embodiments, the indication information may be carried in RRC configuration information.

In some embodiments, the indication information may indicate a correspondence between an uplink logical channel that triggers the SR and the at least one DRX group to enter the DRX Active Time.

In some embodiments, when the indication information indicates that the uplink logical channel that triggers the SR corresponds to a first DRX group, the indication information may indicate the first DRX group as the at least one DRX group to enter the DRX Active Time.

In some embodiments, when the indication information indicates that the uplink logical channel that triggers the SR corresponds to a second DRX group, the indication information may indicate the second DRX group as the at least one DRX group to enter the DRX Active Time.

In some embodiments, when the indication information indicates that the uplink logical channel that triggers the SR corresponds to a first DRX group and a second DRX group, the indication information may indicate the first DRX group and the second DRX group as the at least one DRX group to enter the DRX Active Time An embodiment of the present disclosure further provides a terminal device. The terminal device includes a processor and a memory for storing a computer program executable on the processor. The processor is configured to, when executing the computer program, perform the steps of the above discontinuous reception method performed by the terminal device.

An embodiment of the present disclosure further provides a network device. The network device includes a processor and a memory for storing a computer program executable on the processor. The processor is configured to, when executing the computer program, perform the steps of the above discontinuous reception method performed by the network device.

An embodiment of the present disclosure further provides a chip. The chip includes a processor configured to invoke and execute a computer program from a memory, to enable a device provided with the chip to perform the above discontinuous reception method performed by the terminal device.

An embodiment of the present disclosure further provides a chip. The chip includes a processor configured to invoke and execute a computer program from a memory, to enable a device provided with the chip to perform the above discontinuous reception method performed by the network device.

An embodiment of the present disclosure further provides a storage medium. The storage medium stores an executable program which, when executed by a processor, implements the above discontinuous reception method performed by the terminal device.

An embodiment of the present disclosure further provides a storage medium. The storage medium stores an executable program which, when executed by a processor, implements the above discontinuous reception method performed by the network device.

An embodiment of the present disclosure further provides a computer program product. The computer program product includes computer program instructions that cause a computer to perform the above discontinuous reception method performed by the terminal device.

An embodiment of the present disclosure further provides a computer program product. The computer program product includes computer program instructions that cause a computer to perform the above discontinuous reception method performed by the network device.

An embodiment of the present disclosure further provides a computer program. The computer program causes a computer to perform the above discontinuous reception method performed by the terminal device.

An embodiment of the present disclosure further provides a computer program. The computer program causes a computer to perform the above discontinuous reception method performed by the network device.

Figure 12:
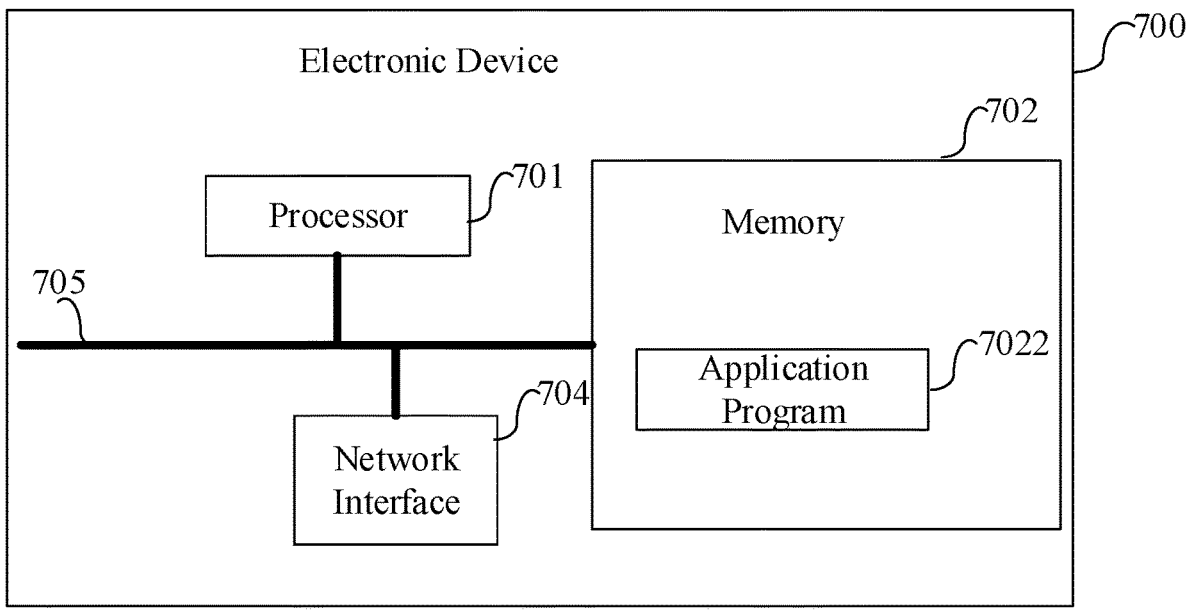
FIG. 12 is a schematic diagram showing a hardware structure of an electronic device according to an embodiment of the present disclosure.

FIG. 12 is a schematic diagram showing a hardware structure of an electronic device (terminal device or network device) according to an embodiment of the present disclosure. The electronic device 700 includes: at least one processor 701, a memory 702, and at least one network interface 704. The components in the electronic device 700 are coupled together via a bus system 705. It can be appreciated that the bus system 705 is configured to implement connection and communication between these components. In addition to a data bus, the bus system 705 also includes a power bus, a control bus, and a status signal bus. However, for the purpose of description, these buses are denoted as the bus system 705 in FIG. 12.

It can be appreciated that the memory 702 may be a transitory memory or a non-transitory memory, and may also include both transitory and non-transitory memories. Here, the non-transitory memory can be a ROM, a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory (e.g., magnetic disk storage or magnetic tape storage), an optical disc, or a Compact Disc Read-Only Memory (CD-ROM). The transitory memory may be a Random Access Memory (RAM), which can be used as an external cache. As non-limiting examples, various forms of RAMs are available, such as Static Random Access Memory (SRAM), Synchronous Static Random Access Memory (SSRAM), Dynamic Random Access Memory (DRAM), Synchronous Dynamic Random Access Memory (SDRAM), Double Data Rate Synchronous Dynamic Random Access Memory (DDRSDRAM), Enhanced Synchronous Dynamic Random Access Memory (ESDRAM), SyncLink Dynamic Random Access Memory (SLDRAM), or Direct Rambus Random Access Memory (DRRAM). The memory 702 described in the embodiment of the present disclosure is intended to include, but not limited to, any of these and any other suitable types of memories.

The memory 702 in the embodiment of the present disclosure is configured to store various types of data to support the operation of the electronic device 700. Examples of such data include: any computer program operable on the electronic device 700, such as an application program 7022. The program for implementing the method of the embodiment of the present disclosure may be included in the application program 7022.

The method disclosed in any of the embodiments of the present disclosure may be applied to the processor 701 or implemented by the processor 701. The processor 701 may be an integrated circuit chip with signal processing capabilities. In the implementation process, the steps of any of the above methods can be performed by a hardware integrated logic circuit in the processor 701 or instructions in the form of software. The above processor 701 may be a general-purpose processor, a Digital Signal Processor (DSP), or any other programmable logic device, discrete gate or transistor logic device, discrete hardware component, or the like. The processor 701 may implement or execute the methods, steps, and logical block diagrams disclosed in the embodiments of the present disclosure. The general-purpose processor may be a microprocessor or any conventional processor or the like. The steps of the method disclosed in any of the embodiments of the present disclosure may be directly embodied as being executed and completed by a hardware decoding processor, or by a combination of hardware and software modules in the decoding processor. The software modules may be located in a storage medium, which may be provided in the memory 702. The processor 701 reads information from the memory 702 and performs the steps of any of the methods in combination with its hardware.

In an exemplary embodiment, the electronic device 700 may be implemented by one or more Application Specific Integrated Circuits (ASICs), DSPs, Programmable Logic Devices (PLDs), Complex Programmable Logic Devices (CPLDs), FPGAs, general-purpose processors, controllers, MCUs, MPUs, or other electronic components to implement any of the methods.

The present disclosure has been described with reference to flowcharts and/or block diagrams of methods, devices (systems), and computer program products according to embodiments of the present disclosure. It can be appreciated that each process and/or block in the flowcharts and/or block diagrams, and the combination of processes and/or blocks in the flowcharts and/or block diagrams, can be implemented by computer program instructions. These computer program instructions can be provided to a processor of a general-purpose computer, a special-purpose computer, an embedded processor, or any other programmable data processing device to generate a machine, such that instructions executed by the processor of the computer or any other programmable data processing device can generate means for implementing the functions specified in one or more processes in the flowcharts and/or one or more blocks in the block diagrams.

These computer program instructions can also be stored in a computer-readable memory that can direct a computer or any other programmable data processing device to operate in such a manner that instructions stored in the computer-readable memory can generate an article of manufacture including instruction means for implementing the functions specified in one or more processes in the flowcharts and/or one or more blocks in the block diagrams.

These computer program instructions can also be loaded on a computer or any other programmable data processing device, such that a sequence of operation steps can be executed on the computer or any other programmable device to generate computer-implemented processes, so as to perform the steps for implementing the functions specified in one or more processes in the flowcharts and/or one or more blocks in the block diagrams on the computer or any other programmable device.

It is to be noted that the terms "system" and "network" are often used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

While the preferred embodiments of the present disclosure have been described above, they are not intended to limit the scope of the present disclosure. Any modifications, equivalents and improvements that are made without departing from the spirit and principle of the present disclosure are to be encompassed by the scope of the present disclosure.

What is claimed is:

1. A discontinuous reception method, comprising:
    determining, by a terminal device when a Media Access Control (MAC) entity of the terminal device comprises two Discontinuous Reception (DRX) groups and the terminal device transmits a Scheduling Request (SR) on a Physical Uplink Control Channel (PUCCH) of a first serving cell, at least one DRX group to enter DRX Active Time based on indication information transmitted by a network device, wherein the indication information indicates a correspondence between an uplink logical channel that triggers the SR and the at least one DRX group to enter the DRX Active Time.

2. The method according to claim 1, wherein said determining, by the terminal device, the at least one DRX group to enter the DRX Active Time comprises:
    determining, by the terminal device, the at least one DRX group to enter the DRX Active Time based on the first serving cell.

3. The method according to claim 1, wherein said determining, by the terminal device, the at least one DRX group to enter the DRX Active Time comprises:
    determining, by the terminal device, a first DRX group and a second DRX group corresponding to serving cells of the terminal device as the at least one DRX group to enter the DRX Active Time,
    wherein the first DRX group and the second DRX group correspond to different cells.

4. A terminal device, comprising a processor and a memory for storing a computer program executable on the processor, wherein the processor is configured to, when executing the computer program:
    determine, when a Media Access Control (MAC) entity of the terminal device comprises two Discontinuous Reception (DRX) groups and the terminal device transmits a Scheduling Request (SR) on a Physical Uplink Control Channel (PUCCH) of a first serving cell, at least one DRX group to enter DRX Active Time based on indication information transmitted by a network device, wherein the indication information indicates a correspondence between an uplink logical channel that triggers the SR and the at least one DRX group to enter the DRX Active Time.

5. The terminal device according to claim 4, wherein said determining the at least one DRX group to enter the DRX Active Time comprises:
    determining the at least one DRX group to enter the DRX Active Time based on the first serving cell.

6. The terminal device according to claim 4, wherein said determining the at least one DRX group to enter the DRX Active Time comprises:
    determining a first DRX group and a second DRX group corresponding to serving cells of the terminal device as the at least one DRX group to enter the DRX Active Time,
    wherein the first DRX group and the second DRX group correspond to different cells.

7. A network device, comprising a processor and a memory for storing a computer program executable on the processor, wherein the processor is configured to, when executing the computer program:
    transmit indication information to a terminal device, the indication information being used by the terminal device to determine, when a Media Access Control (MAC) entity of the terminal device comprises two Discontinuous Reception (DRX) groups and the terminal device transmits a Scheduling Request (SR) on a Physical Uplink Control Channel (PUCCH) of a first serving cell, at least one DRX group to enter DRX Active Time, wherein the indication information indicates a correspondence between an uplink logical channel that triggers the SR and the at least one DRX group to enter the DRX Active Time.

* * * * *